United States Patent [19]
Tosaki

[11] Patent Number: 5,712,649
[45] Date of Patent: Jan. 27, 1998

[54] HEAD-MOUNTED IMAGE DISPLAY

[75] Inventor: Kenji Tosaki, Tokyo, Japan

[73] Assignee: Sega Enterprises, Tokyo, Japan

[21] Appl. No.: 743,917

[22] Filed: Nov. 5, 1996

Related U.S. Application Data

[60] Continuation of Ser. No. 333,859, Nov. 3, 1994, abandoned, which is a division of Ser. No. 968,855, Oct. 30, 1992, Pat. No. 5,392,158.

[30] Foreign Application Priority Data

| Nov. 1, 1991 | [JP] | Japan | 3-315490 |
| Nov. 30, 1991 | [JP] | Japan | 3-341866 |
| Dec. 25, 1991 | [JP] | Japan | 3-357091 |

[51] Int. Cl.$^6$ .................................................. G04G 5/00
[52] U.S. Cl. ........................ 345/8; 345/7; 359/13; 359/630
[58] Field of Search ................. 345/7, 8, 9; 359/13, 359/630

[56] References Cited

U.S. PATENT DOCUMENTS

| H779 | 5/1990 | Verona | 345/8 |
| 4,042,957 | 8/1977 | Ellis . | |
| 4,061,135 | 12/1977 | Widran | 128/6 |
| 4,395,731 | 7/1983 | Schoolman . | |
| 4,437,113 | 3/1984 | Lee . | |
| 4,571,628 | 2/1986 | Thornton . | |
| 4,636,866 | 1/1987 | Hattori . | |
| 4,651,201 | 3/1987 | Schoolman . | |
| 4,695,129 | 9/1987 | Faessen . | |
| 4,757,714 | 7/1988 | Purdy . | |
| 4,786,966 | 11/1988 | Hanson . | |
| 4,796,987 | 1/1989 | Linden . | |
| 4,869,575 | 9/1989 | Kubik | 345/8 |
| 4,878,046 | 10/1989 | Smith | 345/8 |
| 5,003,300 | 3/1991 | Wells . | |
| 5,005,213 | 4/1991 | Hanson . | |
| 5,081,542 | 1/1992 | Efron et al. . | |
| 5,153,569 | 10/1992 | Kawamura | 345/8 |
| 5,320,534 | 6/1994 | Thomas | 345/8 |

Primary Examiner—Richard Hjerpe
Assistant Examiner—Kent Chang
Attorney, Agent, or Firm—Price, Gess & Ubell

[57] ABSTRACT

A head-mounted image display comprising a housing for covering both the eyes of the user, a support for mounting the housing on the head of the user, an image light emitting unit provided at a predetermined position in the housing for emitting image light, a pair of right and left convex lenses provided at both the eyes in the housing for enlarging the image produced by the image light emitting means, and an optical system provided within the housing for guiding the image appearing on the image light emitting unit to the pair of right and left convex lenses.

6 Claims, 8 Drawing Sheets

HEAD-MOUNTED IMAGE DISPLAY

This is a continuation of application Ser. No. 08/333,859, filed on Nov. 3, 1994, now abandoned, which is a division of U.S. application No. 07/968,855, filed Oct. 30, 1992, now U.S. Pat. No. 5,392,158, issued on Feb. 21, 1995.

BACKGROUND OF THE INVENTION

The present invention relates to head-mounted image displays such as glasses or goggles worn before both eyes of the user. More particularly, the present invention relates to image displays suitable for portable television sets, video recorders, computers, television game machines which the user can use while moving his body.

BACKGROUND ART

Head-mounted image displays are conventionally known, as disclosed in U.S. Pat. Nos. 4,695,129, 4,796,987, 4,437,113, 4,786,966, 5,005,213, 4,757,714, and 5,003,300.

Any of these conventional techniques only superimposes simple displays of numerals or the like on a part of the surfaces of glasses or goggles, so that most of these techniques do not allow the user to view an image with both his eyes. Some of them allows the user to view an image with both his eyes, but display a small image so as not to be an obstacle to an external field of view which the user can view through his glasses or goggles. For such reason, the conventional techniques are not suitable for display of a complicated beautiful scene with realism such as an image on a television set.

Another conventional technique which eliminates such drawbacks is disclosed in published unexamined Japanese patent application Hei 1-133479. As shown in FIG. 12, in this technique, a small television set 90 is mounted on the head of the user, its image is reflected by a reflector 91 provided between both eyes of the user, and formed by a concave mirror 92 provided before both the eyes. The conventional technique has the advantages of enlargement of an image on the television set 90 by the concave mirror 92 and of the user being able to view the image on the concave mirror 92 with both his eyes.

However, the conventional techniques have the drawback that distortions appear when the image is largely enlarged because the concave mirror 92 is used as means for enlarging the image. If a properly shaped concave mirror such as that used in a telescope is used, there are no distortions involved in the image even if the image is enlarged as long as the focal length of the concave mirror 92 and the positions of the television set 90 and the reflector 91 are selected appropriately. However, a head-mounted image display such as goggles which is used on the face of the user is limited in dimension so as to be slightly wider than the distance between both the eyes and the height of the display is limited to the distance between the forehead and nose of the user. If a problem of weight balance is considered which occurs when such device is mounted on the head of the user, a quantity of protrusion of the display away from the surface of the face of the user cannot be so large.

By such limitations, a concave mirror with a large curvature is difficult to use in the conventional technique, so that only a concave mirror with a long focal length and a small image magnification can be used. If an image is tried to be enlarged under the above-mentioned limitation of dimensions, the shape of the concave mirror cannot be a correct spherical surface, and hence the enlarged image would be distorted.

It seems that a larger image can be projected onto a concave mirror 92 by enlarging the: dimensions of the television see 90 in the conventional technique. However, in this technique, the reflector 91 is disposed in dead angle between both the eyes of the user, so that the dimensions of the reflector 91 are limited. Therefore, the dimensions of the television set 90 cannot be increased. The use of a large reflector 91 to the dimensions of the television set 90 would cause the reflector 91 to go out of a dead angle for both the eyes, so that the reflector 91 would be an obstacle to viewing an image on the concave mirror 92.

As described above, the conventional technique illustrated in FIG. 12 has the following drawbacks:

a. Since the concave mirror 92 is used, the magnification of the image cannot be increased to obtain a distortion-free image: and b. Since the reflector 91 is provided in the dead angle between both the eyes, the dimensions of the television set 90 cannot be increased.

It is therefore a main object of the present invention to provide a head-mounted image display which is capable of displaying an enlarged distortion-free image.

It is a specified object of the present invention to provide a head-mounted small image display which is improved in portability, and allows the user to view an enlarged image, using a reflector and a convex lens.

It is a further object of the present invention to provide a head-mounted image display which is capable of using a larger reflector and a larger television screen with the reflector provided before both the eyes of the user being no obstacle by causing the image on the television screen to be reflected by a half mirror.

SUMMARY OF THE INVENTION

In order to achieve the above objects, in one aspect of the present invention, there is provided a head-mounted image display comprising:

a housing for covering both the eyes of the user;

means for mounting the housing on the head of the user;

means such as a television or a liquid crystal display provided at a predetermined position in the housing for emitting image light;

a pair of right and left convex lenses provided at both the eyes in the housing; and optical means such as a reflector or a prism provided within the housing for guiding the image appearing on the image light emitting means to the pair of right and left convex lenses.

According to the present invention, the image on the image display means is guided to both the eyes of the user by the optical means, so that the user can view the image with both his eyes. Since the convex lens enlarges the image, even if the resulting image is enlarged compared to the image size provided by the conventional concave mirror, no distortions are involved in the image and the device is not required to be large-sized.

In another aspect of the present invention, there is provided a head-mounted image display comprising:

a housing for covering both the eyes of the user;

means for mounting the housing on the head of the user;

means provided at a predetermined position within the housing for emitting image light;

a half mirror provided at a position before both the eyes in the housing; and optical means such as a reflector or a lens for guiding the image appearing on the image light emitting means to both the eyes of the user by causing the image to be reflected by and transmitted through the half mirror.

According to the present invention, the image produced by the image producing means is reflected by the half mirror provided before both the eyes of the user, the reflected image is again guided to the half mirror by the other optical means and can be viewed by both the eyes of the user through the translucent mirror. Therefore, even if there is a large reflector before both the eyes of the user, the reflector does not become an obstacle to viewing the image. Thus, the large reflector and large image producing means which projects the image to the reflector can be used.

DETAILED DESCRIPTION (1) First Embodiment:

A first embodiment of the present invention will be described with reference to FIGS. 1-3.

Figure 1:
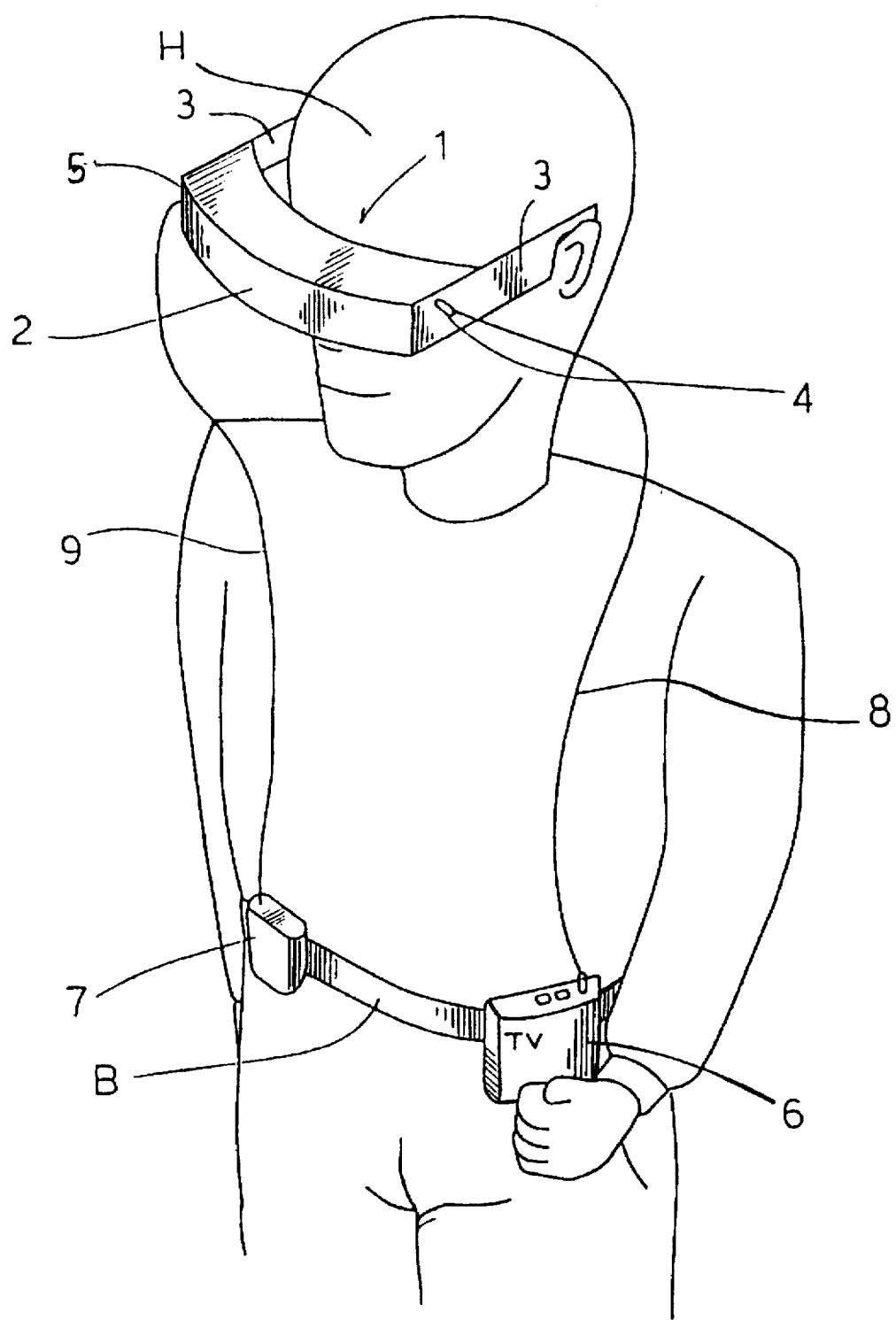
FIG. 1 is a perspective view of a head-mounted image display according to the present invention, illustrating the use of the display.

FIG. 1 is a perspective view of a head-mounted image display 1 mounted on the head H of the user. Display 1 is provided with housing 2 which contains an image producing unit and an optical system therein, and a pair of ear hookers 3 for supporting housing 2 on the head of the user in the same manner that glasses are worn. Housing 2 has on one side an input terminal 4 which receives an image signal and a voice signal or a control signal for display 1, and on the other side a power source terminal 5. The user attaches a television tuner 6 and a battery box 7 to a waist belt B with the television tuner 6 and the input terminal 4 being connected by a signal connection cord 8. The battery box 7 and the power source terminal 5 are also connected by a power source connection cord 9.

Figure 2:
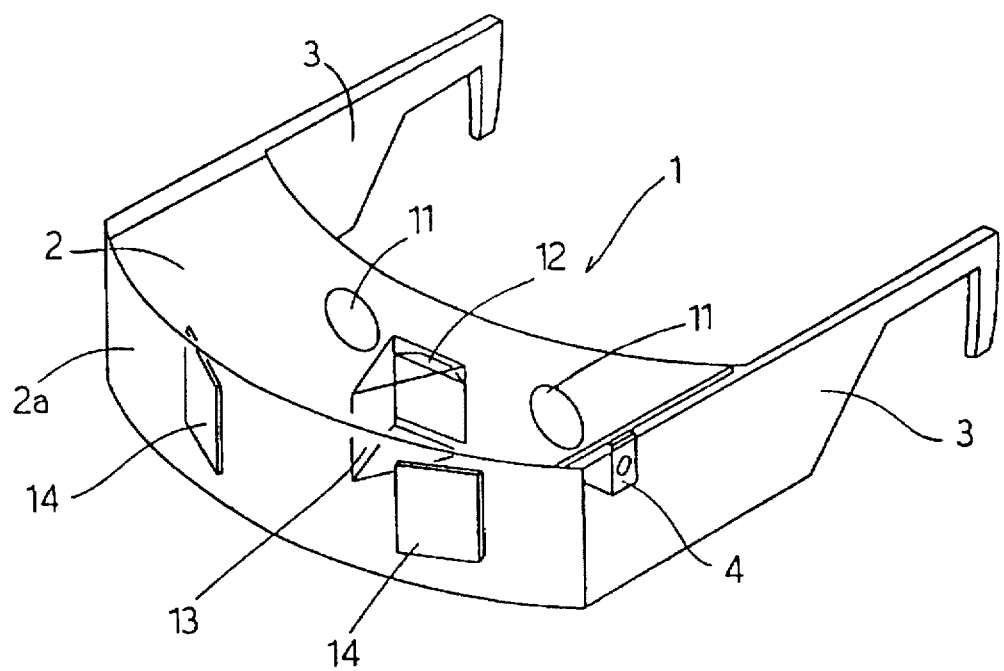
FIG. 2 is a perspective view of a first embodiment of the display according to the present invention.
Figure 3:
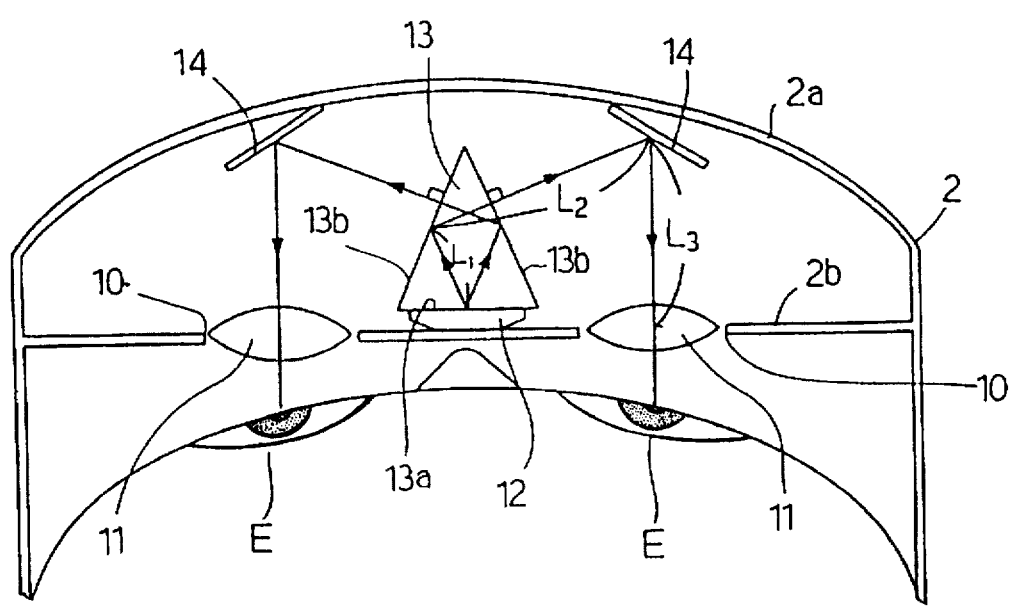
FIG. 3 is a plan view of an optical system of the first embodiment.

The structure of the display 1 is as shown in FIGS. 2 and 3. Housing 2 is of a hollow box which has an outer surface 2a curved along the face of the user. While the inner surface 2b of housing 2 may be curved like the outer surface 2a, it is flat in this embodiment as shown in FIG. 3. The inner surface 2b of housing 2 is provided with openings 10 aligning with both the eyes E of the user with convex lens 11 attached fixedly in the openings 10. An image light emitting unit 12 is provided inside housing 2 and may be a small CRT type television set or a liquid crystal display (LCD) may be used. In the present embodiment, a small thin liquid Crystal display is used. The image light emitting unit 12 is provided between right and left convex lenses 11 on the inner surface 2b of the housing so as to be in the dead angle for both the eyes of the user. The image light produced from the image light emission unit 12 is directed forward or toward the outer housing ink surface 2a.

A prism 13 is provided before image light emitting unit 12 in the housing 2. Prism 13 has an isosceles-triangular cross-section with a tip angle of 45 degrees. It is fixed to housing 2 such that the prism is upstanding and that a surface 13a corresponding to the bottom side of the isosceies-triangle is adjacent to the surface of the image light emitting unit 12. Provided on the inside surface of the outer housing surface 2a are right and left reflector mirrors 14 corresponding to the right and left convex lenses 11. The reflector mirrors 14 are each fixed to housing 2 in such an angle that light passing perpendicular to each of right and left tilted surfaces 13b of prism 13 is reflected by a reflector mirror 14 to arrive at a corresponding convex lens 11 or such that the angle formed between the central axis of convex lens 11 and the corresponding reflector mirror surface is equal to the angle formed between a straight line perpendicular to the tilted surface of prism 13 and the reflector mirror surface.

Convex lenses 11 are each selected such that the image on image light emitting unit 12 is viewed enlarged. In order that the image is enlarged by the convex lens, the image is required to be positioned within its focal length. Therefore, it is required that the sum of the distance L1 between a point on a surface of image light emission unit 12 where the image light is emitted and a point on tilted surface 13b in the prism where the travelling light from is internally reflected, the distance L2 between the point on the tilted surface 13b where the light has been internally reflected and the associated reflector 14 at which the image light then arrives after having passed through another tilted surface 13b so as to be perpendicular to this surface 13b, and the distance L3 between the just-mentioned reflector mirror 14 and the center of the associated convex lens 11 at which the reflected light arrives is shorter than the focal length of that convex lens 11.

The magnification of the image by convex lens 11 is determined by a position where the image enlarged by the convex lens (optically, a virtual image) is formed and the focal length of convex lens 11. Usually, as the focal length of a convex lens is shorter compared to the position where the virtual image is formed, the magnification is larger. In this embodiment, the positions of image light emitting unit 12, prism 13, reflector mirror 14 and convex lens 11 and the focal length of convex lens 11 are set appropriately in accordance with a desired magnification of the image. The attachment angle of the right and left convex lenses 11 relative to housing 2 is set such that the central axes of the right and left convex lenses 11 intersect at the position where the enlarged image is formed. By doing so, the view lines of both the eyes of the user who view one point on the image on the image light emitting unit 12 collect on one point on the enlarged image, so that there is no deviation between the two images which are viewed by both the eyes of the user.

The operation of the first embodiment, thus constructed, is as follows. When the power source is turned on to supply power to image light emitting unit 12 from battery box 7, an image is displayed on image light emitting unit 12 in accordance with a voice, an image and a control signal from television tuner 6. The image light enters prism 13 disposed before image light emitting unit 12, and is reflected by the right and left tilted surfaces of the prism. Thus, only light entering the opposite tilted surface of the prism in perpendicular relationship to this tilted surface exits prism 13. As a result, the image on image light emitting unit 12 is separated by prism 13 to right and left images. The image light exiting prism 13 is then reflected by the right and left reflector mirrors 14, the reflected light enters into and is reflected by right and left convex lenses 11, and arrive at both the eyes of the user.

Since in this case the distance L1+L2+L3 between image light emitting unit 12 and each of convex lenses 11 is shorter than the focal length of right and left convex lenses 11, the image on image light emitting unit 12 is enlarged by convex lenses 11, the magnification P of which is represented by $$P = 1 + M/F$$

$$P < 1 + \frac{M}{(L_1+L_2+L_3)}$$

where M is the distance between each of the convex lenses and the position of the enlarged image, and F is the focal length of that convex lens 11. By selecting these values appropriately, an Image enlarged at a desired magnification can be seen at a desired position.

As described above, according to the first embodiment, a distortion-free enlarged image can be viewed by setting the focal length of the convex lenses appropriately. Especially, in order to obtain a larger magnification, it is required to reduce the distance between image light emitting unit 12 and the respective convex lenses and the focal length of the convex lenses, but the dimensions of the optical system incorporated in the housing are reduced by doing so. Therefore, by the first embodiment, a larger magnification is obtained even if the device is reduced in size. In contrast to the conventional technique where an increase in the magnification causes an overall device such as the concave mirrors to be larger-scaled.

Since in the first embodiment the image appearing on one image light emitting unit 12 is guided to both the right and left convex lenses for viewing purposes, there is neither a load on the eyes which view the image nor fatigue. The optical means which guides the image on image light emitting unit 12 to both the eyes of the user is independent, so that if different-color filters are provided before and behind the respective convex lenses for both the eyes of the user and an image picked up by a solid camera and a solid image formed on the basis of the computer graphics are reproduced by image light emitting unit 12, the device is usable as a solid television set. Since in the first embodiment the image on image light emitting unit 12 is twice reflected by one tilted surface of prism 18 and the associated reflector mirror 14, the user can view the same image as that projected by image light emitting unit 12 and not an image inverted laterally.

(2) Second Embodiment

Figure 4:
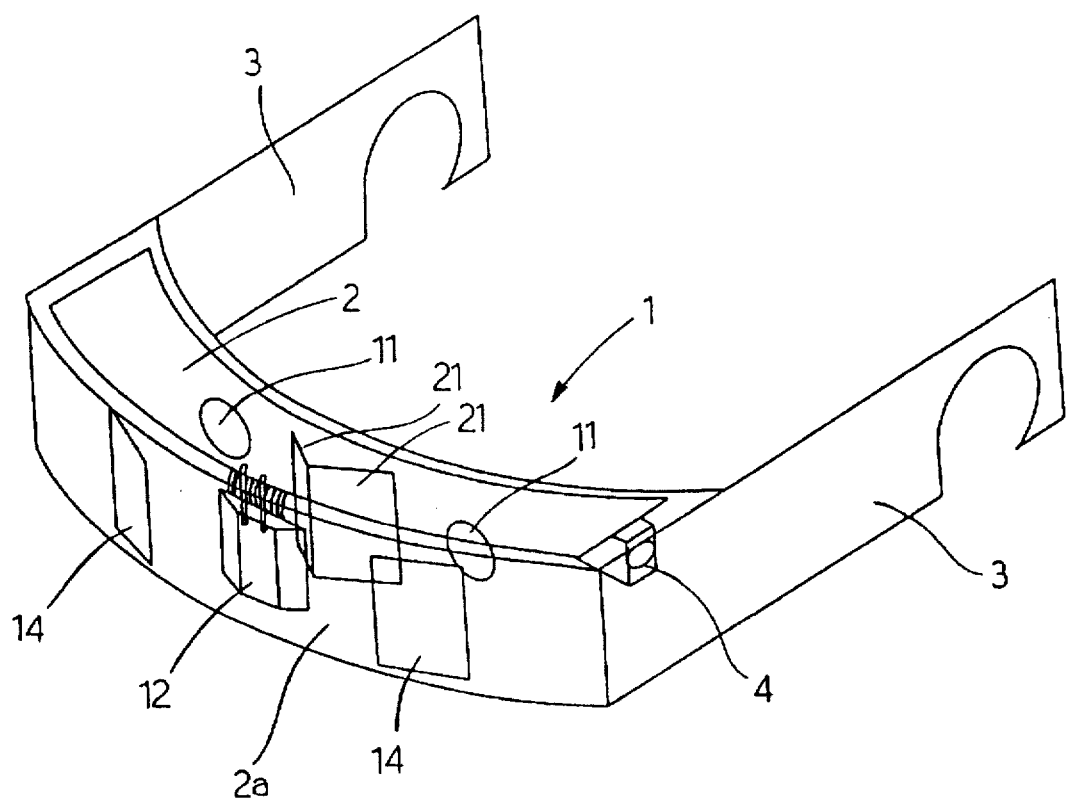
FIG. 4 is a perspective view of an image display of a second embodiment of the present invention.
Figure 5:
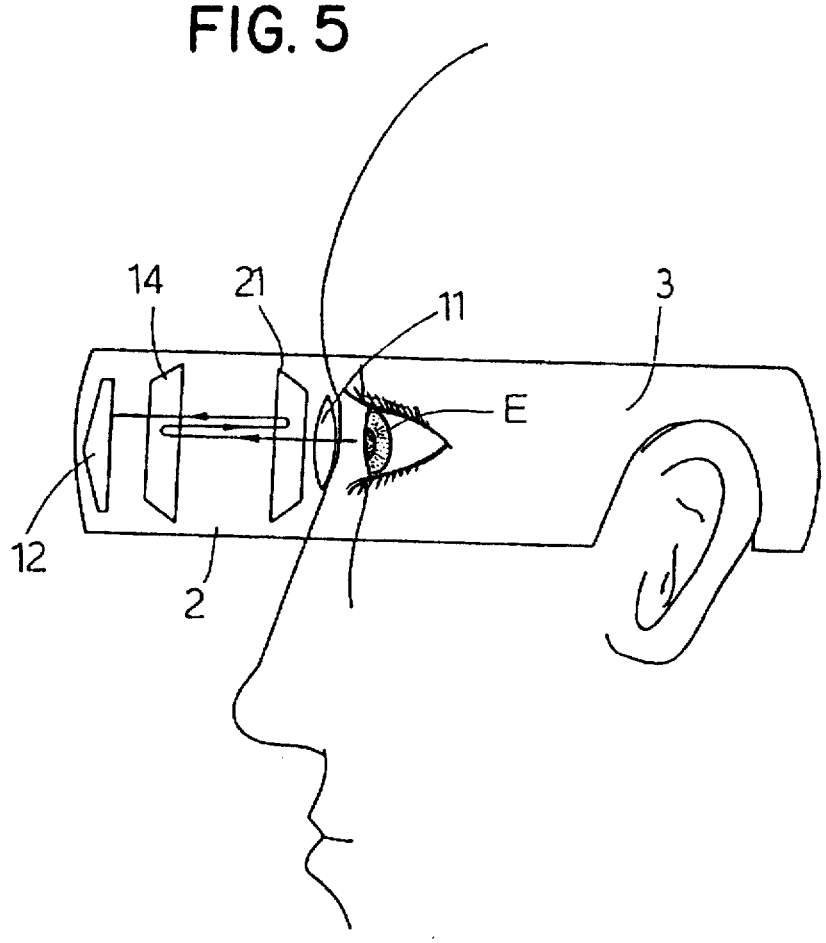
FIG. 5 is a side view of an optical system of the image display of the second embodiment mounted on the head of the user.
Figure 6:
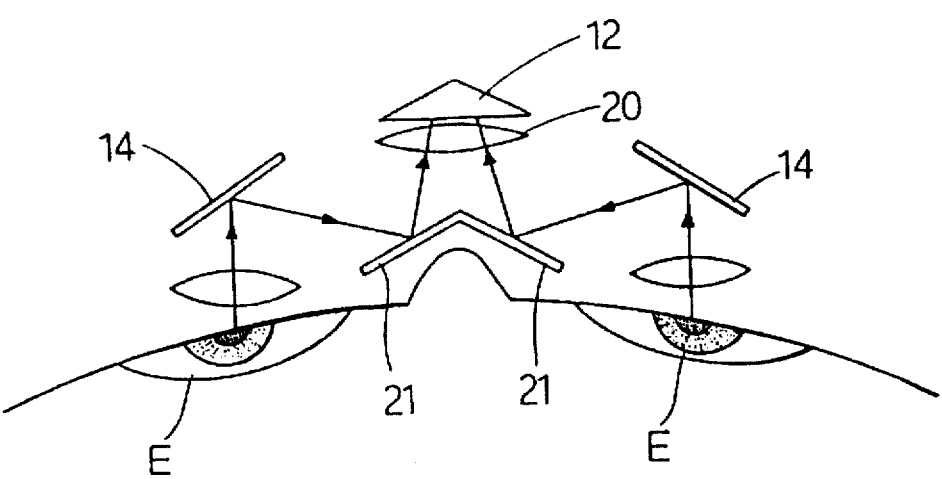
FIG. 6 is a plan view of the optical system of the second embodiment.

A second embodiment of the present invention will be described with reference to FIGS. 4–6 below. An element of the second embodiment similar to that of the first embodiment is identified by the same reference numeral as that used for the first embodiment and further description thereof will be omitted. The structure of the second embodiment in use is similar to that of the first embodiment of FIG. 1. The second embodiment is also provided with housing 2, right and left convex lenses 11, image light emitting unit 12 and right and left reflector mirrors 14.

In the second embodiment, image light emitting unit 12 is fixed between both the eyes in housing 2, and close to outer housing surface 2a with light emitting surface facing the user's face. An objective 20 is provided opposite to the light emitting surface of image light emitting unit 12. Objective 20 is a convex lens, as shown. Image light emitting unit 12 is positioned within the focal length of objective 20 so as to enlarge the image from image light emitting unit 12.

First reflector mirrors 21 are provided between both the eyes in housing 2 and close to the inner housing surface 2b. First reflector mirrors 21 are provided opposite to the light emitting surface of image light emitting unit 12 such that their horizontal cross-sections form a V. That is, the first reflector mirrors 21 are fixed to housing 2 such that the junction point of the first two reflector mirrors 21 protrudes toward image light emitting unit 12. First reflector mirrors 21 are disposed at such an angle that tire overall range of the image on image light emitting unit 12 appears through objective 20. Second reflector mirrors 14 are each provided between first reflector mirror 21 and the associated one of right and left convex lens 11. The second reflector mirrors are the same as those of the first embodiment and fixed to housing 2 at such an angle that the images reflected by the first right and left reflector mirrors are guided to the corresponding right and left convex lenses 11.

Also, in the second embodiment, thus constructed, the first two reflector mirrors guide the image on image light emitting unit 12 to the right and left convex lenses 11. As a result, the right and left convex lenses 11 enlarge the image on image light emitting unit 12. Especially, since in the second embodiment the image on image light emitting unit 12 is twice reflected by the first and second reflector mirrors, the user can view the same image as appears in image light emitting unit 12 and not an image inverted laterally, as in the first embodiment. According to the second embodiment, the first reflector mirrors light compared to the prism of the first embodiment are used to thereby lighten the overall device. The second embodiment also produces advantages similar to those produced by the first embodiment.

(3) Third Embodiment

Figure 7:
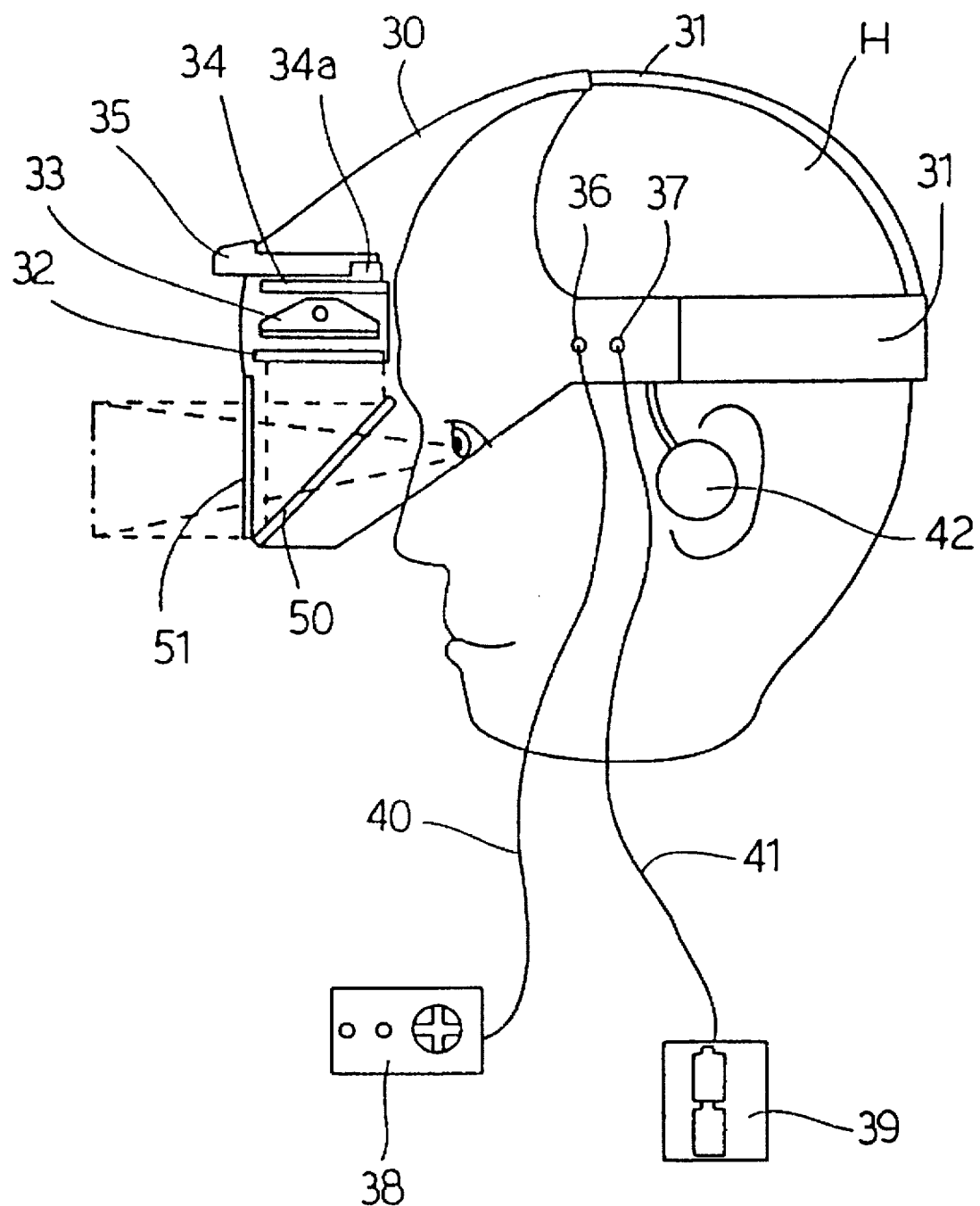
FIG. 7 is a side view of an optical system of the image display of a third embodiment mounted on the head of the user.
Figure 8:
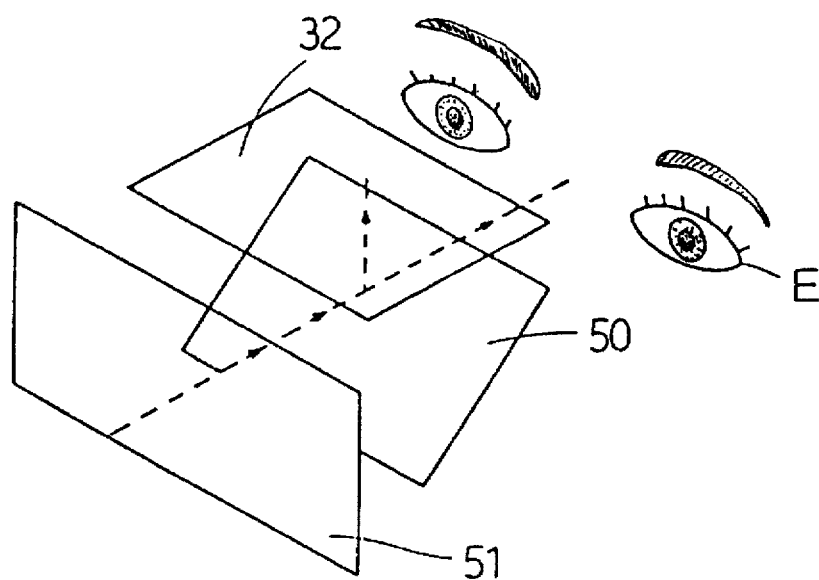
FIG. 8 is a perspective view of the optical system of the third embodiment.
Figure 9:
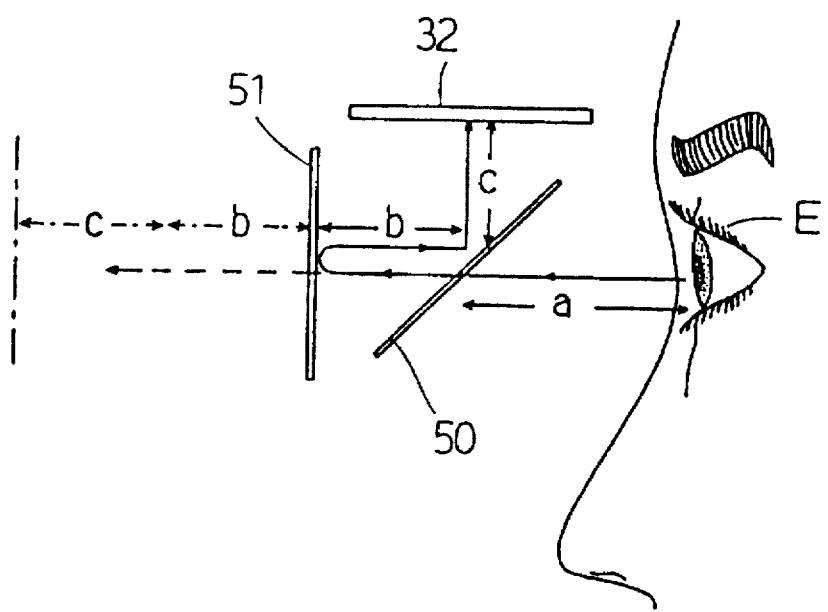
FIG. 9 is a side view of the optical system of the third embodiment.

A third embodiment of the present invention will be described bellow with reference to FIGS. 7–11, which shows the basic aspect of the third embodiment. FIG. 7 is a side view of an optical system mounted on the head of the user. In this embodiment, housing 30 is made of a helmet-like one which covers the upper half of the user's face and is mounted on the head of the user by belts 31 provided on the sides and top of the head. Image light emitting unit 32 is provided up within housing 30 or before the forehead of the user. As an example, image light emitting unit 32 is composed of a liquid crystal display plate fixed to housing 30 with its light portion facing downward. Disposed behind image light emitting unit 32 are a backlight 33, baseplate 34 which incorporates a control computer for image light emitting unit 32, and a software cartridge 35 attached removably on control baseplate 34. The backlight 33 can illuminate the LCD plate Control baseplate 34 is provided with a terminal 34a for connection with cartridge 35. Housing 30 is provided with a terminal 36 for connection with a controller 38 which controls image light emitting unit 32 and a power source terminal 37 with cords 40, 41 connecting terminals 36, 37 and controller 38 and battery box 39, respectively. A headphone 42 is provided on housing 30 for coordination with the image light emitting unit 32 to provide sound.

Image light emitting unit 32, a power source for unit 32 and input means for an image signal may be the corresponding ones in the first and second embodiment.

A first half mirror 50 is provided down within housing tag 30 or before the eyes of the user. First half mirror 50 has a width enough to cover the eyes of the user and is fixed tilted within housing 30 such that its upper edge is close to the user's face and its lower edge is close to the outer surface of housing 30. First half mirror 50 reflects light entering from above and allows light entering from before to be transmitted therethrough. A second half mirror 51 is provided upstanding on the outer surface of housing 30 or on the horizontal extension of the view line of the user. Second half mirror 51 reflects light from inside housing 30 and allows light coming from outside to be transmitted therethrough.

In the third embodiment, thus constructed, data on game software stored in software cartridge 35 is converted to an image signal by the operation of control baseplate 34 and controller 88 connected to the baseplate 84, and the resulting image signal is input to image light emitting unit 32. An image appears then in image light emitting unit 32 and the image light arrives downward at first half mirror 50, which has the property of reflecting light from above. Therefore, light frown image light emitting unit 32 is reflected by half mirror 50 and travels horizontally outward from housing 30. When the image light arrives at second half mirror 51 on the outer housing surface, second half mirror 51 reflects light from inside. Thus, the image light is reflected by second half mirror 51 to arrive again at first half mirror 50. However, since first half mirror 50 has the property of causing horizontal incident light to be transmitted therethrough, first half mirror 51 reflects light from inside. Therefore, image light is reflected by second half mirror 51 and arrives again at first half mirror 50. Since first half mirror 50 has the property of allowing horizontal light to be transmitted therethrough, the arriving image light arriving at first half mirror 50 passes therethrough and arrives at both the eyes of the user present thereafter.

Figure 12:
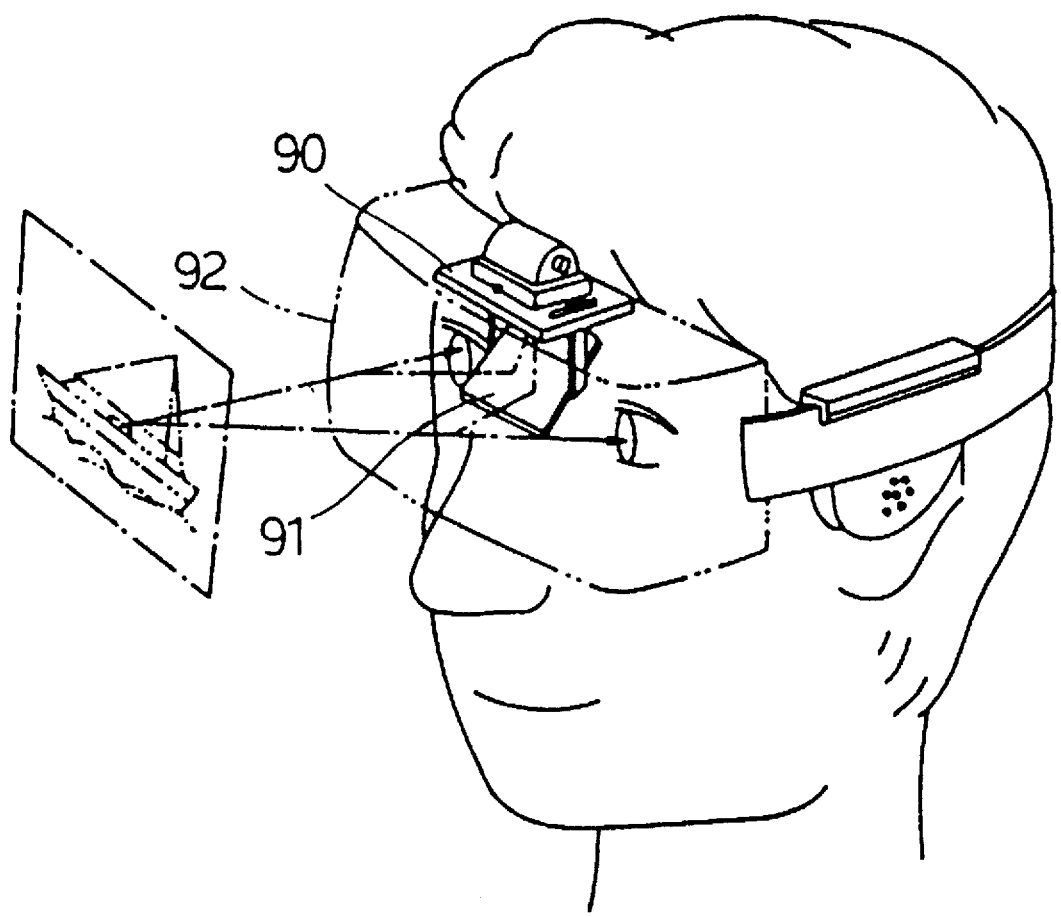
FIG. 12 is a perspective view of a conventional image display.

In this way, according to the third embodiment, half mirror 50 is used as a reflector which projects an image on image light emitting unit 32 to a position before housing 30, so that it is not necessary to put the reflector in a dead angle for both the eyes of the user, as is conventional technique of FIG. 12. As a result, a reflector can be used which has an area larger in width than the distance between both the eyes of the user and hence image light emitting unit 32 which is twice or more as large in area as the conventional one can be used to fill the field of view of the user. Since such large image light emitting unit 32 and half mirror 50 can be used, these elements may be divided into two smaller ones for the right and left eyes of the user with a partition between those smaller ones such that the right and left eyes can view different images. By doing so, a solid image can be viewed. In the present embodiment, the image from image light emitting unit 32 provided up in housing 30 may be reflected twice by two half mirrors 50, 51 such that the user can view the image with both his eyes. In the embodiment, the distance between image light emitting unit 32 and both the eyes of the user is equal to the sum of a+2b+c where a is the distance between both the eyes of the user and second half mirror 51, b is the distance between the first and second half mirrors 50 and 51, and c is the distance between first half mirror 50 and image light emitting unit 82. As a result, a distance of distinct vision is ensured (which is said to be usually 25–30 cm or more) In which the user can observe the image without feeling fatigue and without increases in the vertical and back-and-forth dimensions of the housing.

Since in the embodiment the second half mirror is used as means for reflecting light from first half mirror 50, the user can view both the image from image light emitting unit 32 and an external landscape which passes through second half mirror. When no external landscape is required to be viewed, a regular reflector is used in place of second half mirror 51.

(4) Modifications of the Third Embodiment will be described next

Figure 10:
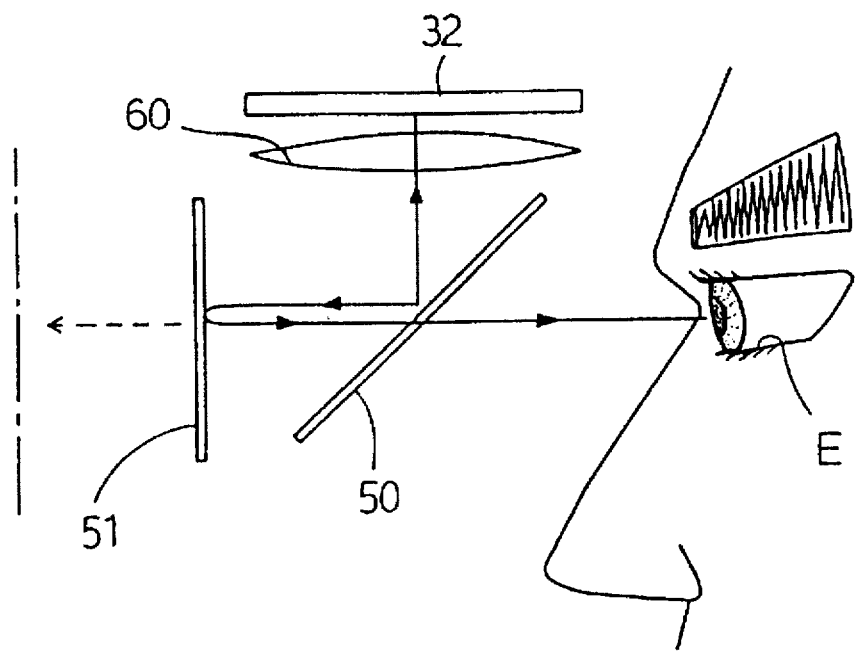
FIG. 10 is a side view of an optical system combined with a convex lens in the third embodiment.

A modification of FIG. 10 is provided with a convex lens 60 which includes a spherical lens or a Fresnel lens disposed close to a light emitting surface of image light emitting unit 32. Convex lens 60 enlarges the image in Image light emitting unit 32, so that the light emitting surface of image light emitting unit 32 is required to be positioned within the focal length of convex lens 60.

By the use of convex lens 60, the enlarged virtual image in image light emitting unit 32 appears at a position remoter from convex lens 60 than the actual position of the image, so that enough distance of distinct vision is ensured even if the distance between the image light emitting unit and both the eyes of the user is reduced. As a result, a small head-mounted image display which allows a large image to be viewed is realized.

Figure 11:
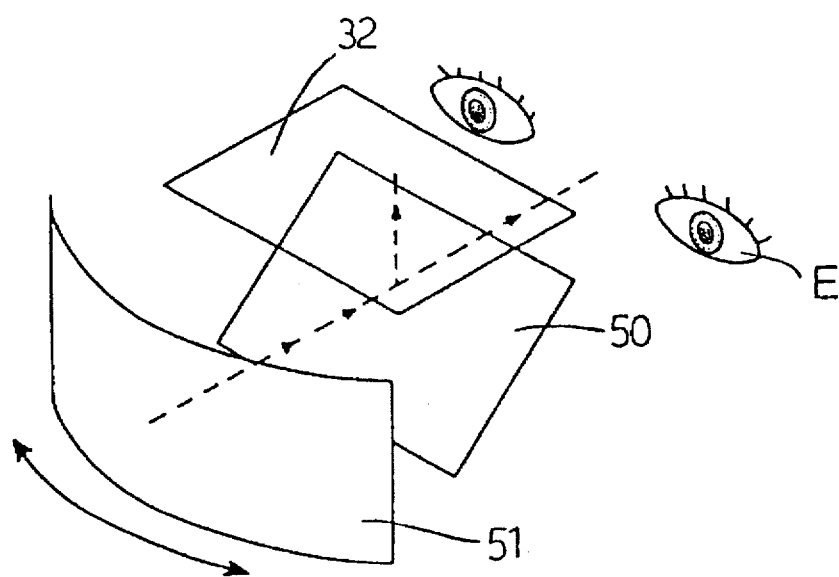
FIG. 11 is a perspective view of nix optical system combined with a concave mirror in the third embodiment.

A modification of FIG. 11 is the use of a concave mirror curved only widthwise as second half mirror 51. According to such concave mirror, the image appearing in image light emitting unit 32 is enlarged transversely, so that the user can view an image with realism such as that in cinemascopes. By curving half mirror 51 in a vertical direction, a vertically enlarged image is viewed. Further, by using a spherical half mirror 51, the overall image is enlarged.

(5) Other Modifications

The present Invention is not limited to the respective above embodiments and contains the following modifications:

(1) The use of the battery box which is the power source and the television tuner are not limited to those of FIG. 1. Both may be formed as a unit, attached to the waist of the user and connected by a cord or a cable to the housing. The tuner, power source, and control push buttons may be incorporated integrally within the housing.

In addition, the output units for image signals from the tuner may be a computer, a image deck, a laser disc. etc. These output units and power sources may be fixed within a room, and these devices and housing may be connected by the user with a cord or a cable having a length within which the user can move.

The power source may be provided within the housing while an image signal or a voice signal may be delivered, for example, from the tuner by radio to the image light emitting unit.

(2) The voice signal delivered from the tuner to the housing may be connected to a headphone or an earphone by using an voice output terminal provided on the housing. Alternatively, the signal may be delivered to a small speaker built in the housing. Of course, arrangement may be such that a speaker is provided within a room, that only the image signal is delivered to the image light emitting unit within the housing and that the voice signal may be delivered to the speaker for reproducing purposes.

When the head-mounted image display according to the present invention is used in a bodily sensation type television game in which the user moves his body to play a game while viewing an image, a stereophonic effect is produced by using a plurality of speakers installed within a room.

(3) The image delivered to the image light emitting unit may he recorded images in a video recorder, and characters or graphic image in a computer in addition to a television program received by the tuner of the television set. A television game through a computer, a controlled image in an industrial robot, and a simulation image such as a car or an airplane are available. p0 (4) The position of the image light emitting unit may be provided not only within the housing, but also above or below the housing as in the third embodiment, also if an optical system having a prism or reflectors is used as in the first embodiment or second embodiment. In that case, the number of reflectors is required to be increased so as to rotate the image in the image light emitting unit, which has been projected in the vertical direction, to the image in the horizontal direction.

(5) In the respective embodiments, the number and positions of prisms and reflectors which constitute the optical system may be changeable. An image can be enlarged or inverted by using a concave mirror as a reflector or by disposing a lens intermediate of the optical system.

The convex lenses used in the respective embodiments may be generally a spherical lens made of glass or plastics. In addition, Fresnel lenses are usable as well.

(6) In the second embodiment, arrangement may be modified such that the first reflectors: 21 are be fixed at angles in which only parts of the light emitting face of image light emitting unit 12 (for example, the right half of the light emitting face for one reflector and the left half for the other reflector) are reflected, that those image portions are guided separately to the right and left convex lenses for viewing purposes, and that the original image is synthesized on the enlarged screen. In that case, the respective reflector mirrors can be miniaturized. By viewing different images with the right and left eyes of the user, the user can view a solid image.

What is claimed is:

1. A head-mounted image display comprising:

a housing for covering both of the eyes of the user;

means for mounting the housing on the head of a user;

means provided at a predetermined position within the housing for emitting image light;

computer means mounted on the housing for controlling the image light emitting means;

a connector mounting on the housing for connection with a software cartridge inserted within the housing to enable the computer means to generate images;

a half mirror provided at a position before and extending across both of the eyes in the housing;

optical means for guiding the image appearing on the image light emitting means to both of the eyes of the user by causing the image to be reflected by and transmitted through the half mirror to occupy the field of view of the respective eyes and to appear at a predetermined distance in space offset from a front of the housing, including a reflector that blocks ambient light and reflects the image for transmission through the half mirror; and a controller connected to the housing by a cord to enable the user to manually input control signals to control the image light emitting means.

2. A head-mounted image display according to claim 1 wherein the emitting image light means has a downward facing light emitting surface for emitting image light;

the half mirror has an upper edge dose to the face of the user, and a lower edge tilted so as to be an outer edge for reflecting light entering from above in the horizontal direction and allowing horizontal light to be transmitted therethrough; and the reflector is provided perpendicular to an outer surface of the housing for reflecting light from inside the housing toward the half mirror.

3. A head-mounted image display according to claim 2 wherein the reflector includes a concave mirror.

4. A head-mounted image display according to claim 1 wherein the optical means includes a concave mirror.

5. A head-mounted image display according to claim 1 wherein the image light emitting means includes a liquid crystal display.

6. A head-mounted image display according to claim 1 further including a base plate mounting both the computer means and the connector for receiving a software cartridge and located on the housing above the user's eyes.

* * * * *